US 12,485,857 B2

(12) United States Patent
Ishibashi et al.

(10) Patent No.: US 12,485,857 B2
(45) Date of Patent: Dec. 2, 2025

(54) VEHICLE CONTROL DEVICE, VEHICLE CONTROL METHOD, AND RECORDING MEDIUM

(71) Applicant: Panasonic Intellectual Property Management Co., Ltd., Osaka (JP)

(72) Inventors: Yuya Ishibashi, Kanagawa (JP); Teppei Shibata, Kanagawa (JP); Yusuke Nakamura, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 115 days.

(21) Appl. No.: 18/584,878

(22) Filed: Feb. 22, 2024

(65) Prior Publication Data

US 2024/0300458 A1 Sep. 12, 2024

(30) Foreign Application Priority Data

Mar. 8, 2023 (JP) ................... 2023-035180

(51) Int. Cl.
*B60T 7/22* (2006.01)
*B60T 8/171* (2006.01)
(52) U.S. Cl.
CPC ................ *B60T 7/22* (2013.01); *B60T 8/171* (2013.01); *B60T 2201/022* (2013.01); *B60T 2210/32* (2013.01)

(58) Field of Classification Search
CPC ...... B60T 7/22; B60T 8/171; B60T 2201/022; B60T 2210/32
USPC .................................. 701/41, 42, 43, 44, 70
See application file for complete search history.

(56) References Cited

U.S. PATENT DOCUMENTS

2021/0356583 A1 11/2021 Kutomi et al.

FOREIGN PATENT DOCUMENTS

JP 2018081050 A 5/2018
JP 2020091158 A 6/2020

*Primary Examiner* — Hai H Huynh
(74) *Attorney, Agent, or Firm* — Seed Intellectual Property Law Group LLP

(57) ABSTRACT

A vehicle control device controls a vehicle on the basis of a detection time representing a distance measured by a range finder device. The range finder device is installed in the vehicle to measure a distance to an object around the vehicle by transmitting and receiving sound waves. The vehicle control device includes a processor that receives an input of a first detection time after movement of the vehicle. The processor outputs an intersection point as coordinates indicating a position of the object when the intersection point is obtained. The intersection point is a point at which an estimated straight line and a first locus intersect. The estimated straight line connects respective positions of the range finder device before and after the movement of the vehicle. The first locus is based on the first detection time.

11 Claims, 10 Drawing Sheets

VEHICLE CONTROL DEVICE, VEHICLE CONTROL METHOD, AND RECORDING MEDIUM

CROSS-REFERENCE TO RELATED APPLICATIONS

This application is based upon and claims the benefit of priority from Japanese Patent Application No. 2023-035180, filed on Mar. 8, 2023, the entire contents of which are incorporated herein by reference.

FIELD

Embodiments described herein relate generally to a vehicle control device, a vehicle control method, and a recording medium.

BACKGROUND

As an existing technique, there is a technique for controlling a vehicle (typically, control for operating a brake) to avoid a collision with an object on the basis of a detection result of a peripheral object obtained by a range finder device such as sonar mounted on a lateral side of the vehicle (for example, Japanese Patent Application Laid-open No. 2018-081050). Such a type of range finder device measures a distance to an object around the vehicle on the basis of a detection time measured by transmitting and receiving sound waves. Therefore, in a case where the vehicle moves in a straight advancing direction, an intersection point of circular-arc loci can be found as a position of a detected object, the circular-arc locus connecting multiple positions at which the object may be present, which are obtained on the basis of a detection time before the movement of the vehicle, and the circular-arc locus connecting multiple positions at which the object may be present, which are obtained on the basis of a detection time after the movement of the vehicle.

SUMMARY

A vehicle control device according to one embodiment of the present disclosure controls a vehicle on the basis of a detection time representing a distance measured by a range finder device. The range finder device is installed in the vehicle to measure a distance to an object around the vehicle by transmitting and receiving sound waves. The vehicle control device includes a memory and a processor connected to the memory. The processor is configured to receive an input of a first detection time after movement of the vehicle. The processor outputs an intersection point as coordinates indicating a position of the object when the intersection point is obtained. The intersection point is a point at which an estimated straight line and a first locus intersect. The estimated straight line connects respective positions of the range finder device before and after the movement of the vehicle. The first locus is based on the first detection time.

DETAILED DESCRIPTION

The following describes the vehicle control device, a vehicle control method, and a recording medium according to an embodiment of the present disclosure with reference to the attached drawings. In existing techniques, for example, in a case where the respective positions of the range finder device before and after the movement of the vehicle and the object are arranged in a straight line when the vehicle turns to move, a distance to the object may be difficult to be measured with high accuracy. Thus, there is the possibility that intersection points of circular-arc loci before and after the movement described above cannot be narrowed down to one intersection point, the position of the object is difficult to be specified, and collision determination accuracy is lowered.

The vehicle control device, the vehicle control method, and the vehicle control program according to the present disclosure are made in view of the situation described above, and can enhance accuracy of collision determination in a case where the vehicle turns to move.

Figure 1:
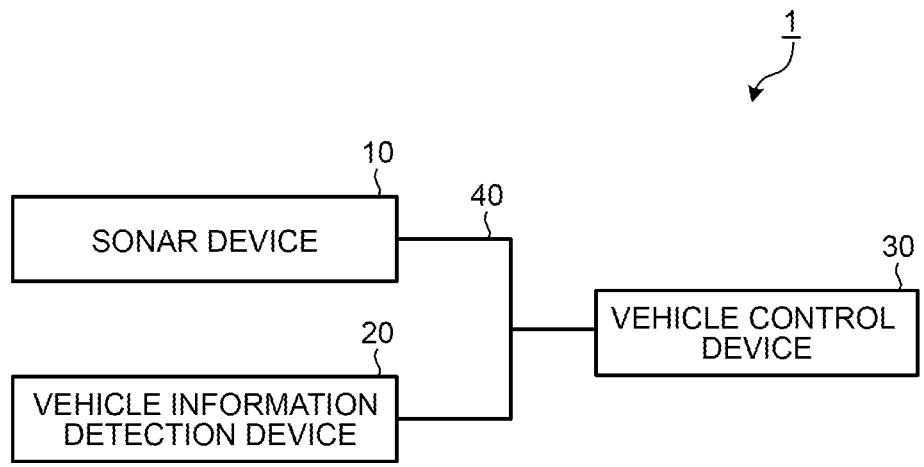
FIG. 1 is a diagram illustrating an example of a schematic configuration of a vehicle control system including a vehicle control device according to an embodiment.

As illustrated in FIG. 1, a vehicle control system 1 includes a sonar device 10, a vehicle information detection device 20, and a vehicle control device 30. These devices are connected via a network 40 such as a controller area network (CAN), for example. Types and the number of devices included in the vehicle control system 1 are not limited to the example in FIG. 1, but other devices may be included therein. For example, the vehicle control system 1 may include an HMI device including a display and the like that can display information.

The sonar device 10 is an example of a "range finder device" installed in a vehicle. The sonar device 10 is capable of measuring a detection time (flying time) indicating a distance to an object around the vehicle by transmitting and receiving sound waves (for example, ultrasonic waves). Sonar devices 10 are respectively mounted on both sides of the vehicle, each transmit sound waves toward a lateral side of the vehicle, and receive the sound waves reflected by a peripheral object to measure a detection time representing a distance to the object. The vehicle information detection device 20 is a device that detects vehicle information such as a vehicle speed and a movement amount of the vehicle (amount indicating how much the vehicle has moved in which direction). The vehicle control device 30 is a device that calculates distance information on the basis of the detection time measured by the sonar device 10, and controls the vehicle on the basis of the vehicle information detected by the vehicle information detection device 20. In the present embodiment, the sonar device 10 obtains the detection time, but the embodiment is not limited thereto. For example, the vehicle control device 30 may obtain the detection time.

Figure 2:
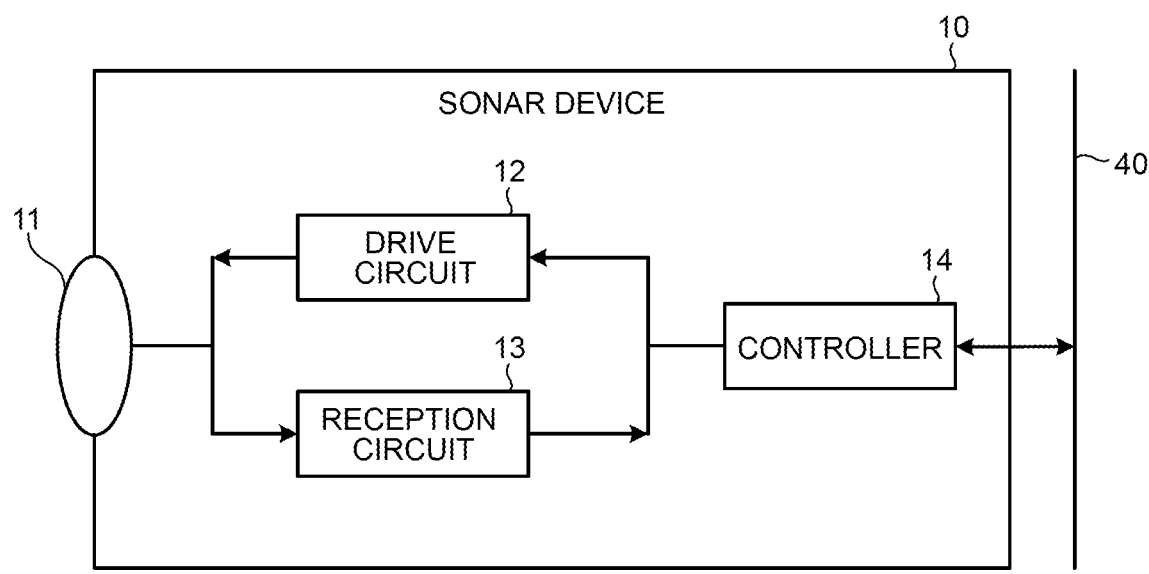
FIG. 2 is a diagram illustrating an example of a hardware configuration of a sonar device according to the embodiment.

Next, the following describes a specific configuration of the sonar device 10. As illustrated in FIG. 2, the sonar device 10 includes a piezoelectric element 11, a drive circuit 12, a reception circuit 13, and a controller 14. The piezoelectric element 11 emits ultrasonic waves by converting driving voltage applied from the drive circuit 12 into sound pressure to be output under control by the controller 14. The ultrasonic waves emitted by the piezoelectric element 11 hit an object (a road surface, an obstacle, and the like) around the vehicle to be reflected, and part of the ultrasonic waves is returned to the sonar device 10 (piezoelectric element 11). The reception circuit 13 can convert the sound pressure emitted by the piezoelectric element into voltage, and generate an echo waveform indicating a temporal change of the voltage corresponding to the sound pressure emitted by the piezoelectric element 11.

The controller 14 can control the drive circuit 12, detect an object around the vehicle on the basis of the echo waveform generated by the reception circuit 13, and generate a detection time to the detected object. The controller 14 transmits the fact that the object around the vehicle is detected and the detection time to the vehicle control device 30 via the network 40. In the following description, information transmitted from the sonar device 10 to the vehicle control device 30 via the network 40 may be referred to as "sonar information" in some cases.

Figure 3:
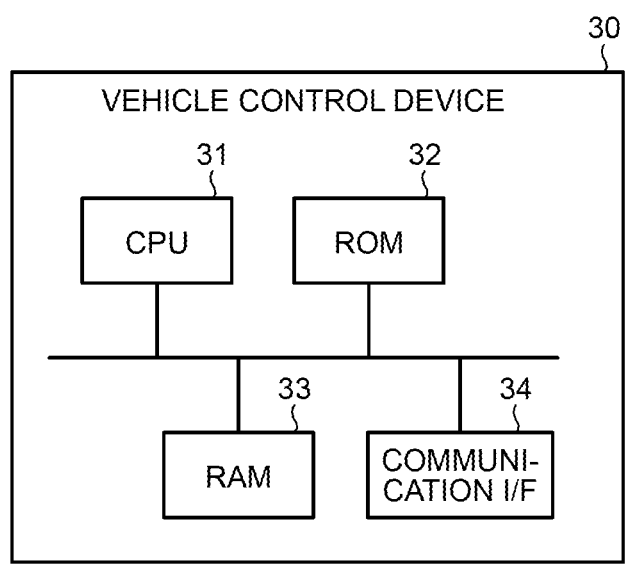
FIG. 3 is a diagram illustrating an example of a hardware configuration of the vehicle control device according to the embodiment.

Next, the following describes a specific configuration of the vehicle control device 30. As illustrated in FIG. 3, the vehicle control device 30 includes a central processing unit (CPU) 31, a read only memory (ROM) 32, a random access memory (RAM) 33, and a communication I/F 34.

The CPU 31 integrally controls an operation of the vehicle control device 30 by executing a computer program, and implements various functions of the vehicle control device 30. The ROM 32 is a non-volatile memory, and stores various kinds of data including a computer program for starting the vehicle control device 30 and a computer program for controlling the operation of the vehicle control device 30. The RAM 33 is a volatile memory including a working area for the CPU 31. The communication I/F 34 is an interface for making connection with the network 40.

Figure 4:
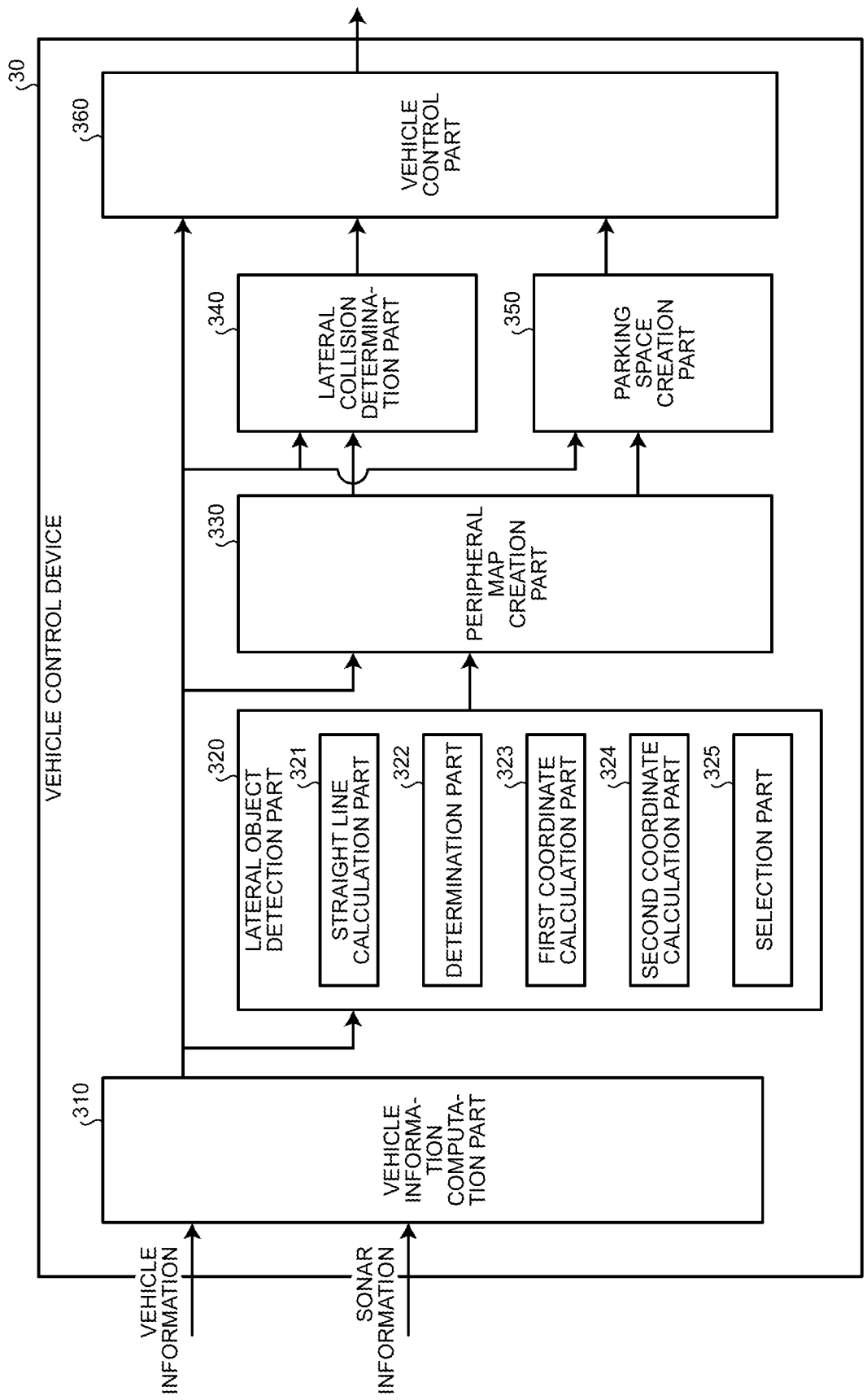
FIG. 4 is a diagram illustrating an example of a function of the vehicle control device according to the embodiment.

As illustrated in FIG. 4, the vehicle control device 30 includes vehicle information computation part 310, a lateral object detection part 320, a peripheral map creation part 330, a lateral collision determination part 340, a parking space creation part 350, and a vehicle control part 360.

The vehicle information computation part 310 acquires the sonar information transmitted from the sonar device 10 and the vehicle information transmitted from the vehicle information detection device 20, and performs various kinds of computation processing on the basis of the acquired vehicle information. Specifically, the vehicle information computation part 310 periodically (at predetermined intervals) computes a movement amount of the vehicle and position information of the sonar device 10 by using acquired vehicle speed information, steering angle information, and the like.

The lateral object detection part 320 detects position information (coordinates) of the object present on a lateral side of the vehicle by using the computed movement amount of the vehicle and position information of the sonar device 10, and the acquired sonar information. As illustrated in FIG. 4, the lateral object detection part 320 includes a straight line calculation part 321, a determination part 322, a first coordinate calculation part 323, a second coordinate calculation part 324, and a selection part 325.

Figure 5:
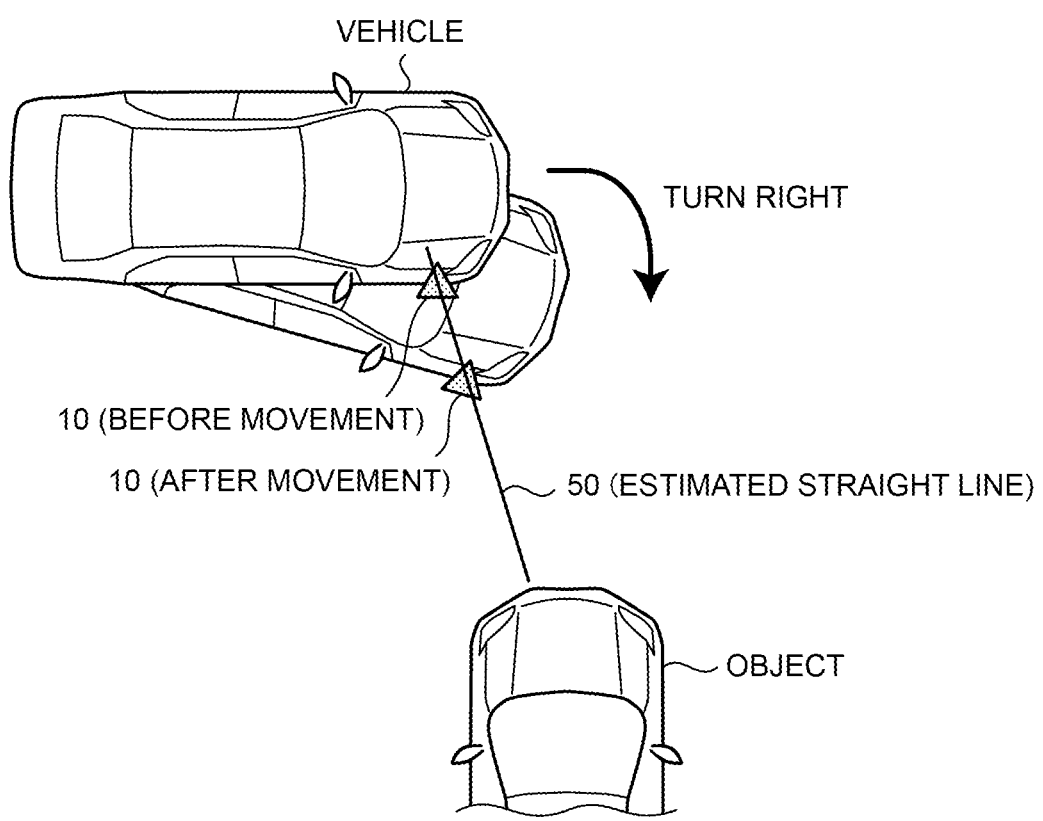
FIG. 5 is a diagram for explaining a method for calculating an estimated straight line connecting respective positions of the sonar device before and after movement of the vehicle according to the embodiment.

The straight line calculation part 321 calculates an estimated straight line connecting respective positions of the sonar device 10 before and after the movement of the vehicle. As illustrated in FIG. 5, for example, in a case where the vehicle turns right, the straight line calculation part 321 calculates an estimated straight line 50 connecting coordinates indicating the respective positions of the sonar device 10 before and after the movement on the basis of the position information (coordinates) of the sonar device 10 before the movement of the vehicle and the position information of the sonar device 10 after the movement of the vehicle. In the example of FIG. 5, the vehicle turns right, so that the estimated straight line 50 is calculated on the basis of pieces of the position information of the sonar device 10 mounted on a right side surface of the vehicle. Herein, the position information of the vehicle (sonar device 10) is changed over time along with its movement. Therefore, the position information after the movement of the vehicle indicates current position information (at a point B) of the vehicle after the vehicle moves from a point A (10 (before the movement) in FIG. 5) to the point B (10 (after the movement) in FIG. 5), for example, computed at the point B. The position information before the movement of the vehicle indicates position information of the vehicle at the point A computed before the vehicle moves to the current position, for example, computed predetermined time before the computation at the point B (at a previous time). Thus, the straight line calculation part 321 calculates a new estimated straight line 50 every time a new piece of the position information of the vehicle (sonar device 10) is computed.

Figure 6:
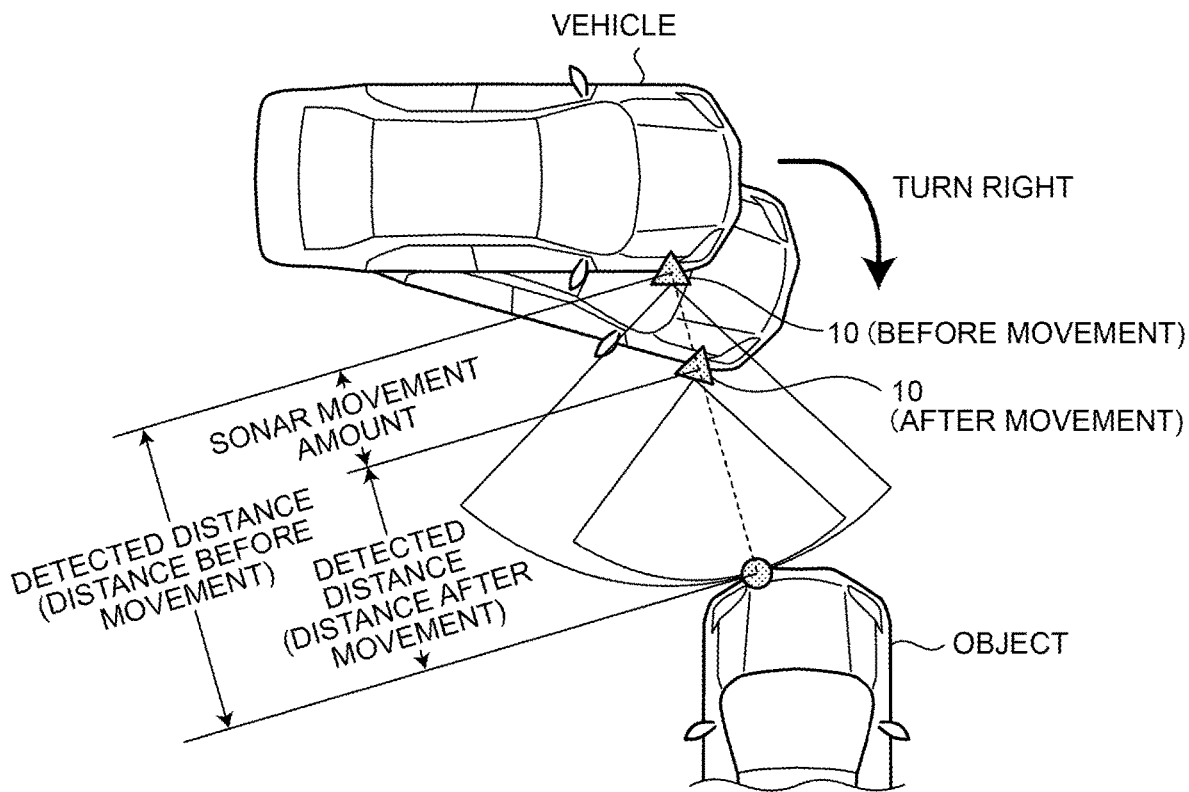
FIG. 6 is a diagram for explaining a method for determining whether an object is positioned on the estimated straight line according to the embodiment.

Returning to FIG. 4, the description will be continued. The determination part 322 determines whether an object (another vehicle in the example of FIG. 5) is positioned on the calculated estimated straight line 50. This object is, for example, a vehicle parked in advance, but may be an object other than the vehicle. As illustrated in FIG. 6, the determination part 322 determines whether the object is positioned on the estimated straight line 50 by using a detected distance to the object (distance before the movement) based on the detection time before the movement of the vehicle, a detected distance to the object (distance after the movement) based on the detection time after the movement of the vehicle, and a sonar movement amount (movement amount of the sonar device 10) before and after the movement of the vehicle. Specifically, in a case where a difference value between the sonar movement amount and a difference between the distance before the movement and the distance after the movement described above is equal to or smaller than a predetermined threshold, the determination part 322 makes determination that the object is positioned on the estimated straight line 50. For example, in a case where the following expression (1) is satisfied, the determination part 322 makes determination that the object is positioned on the estimated straight line 50.

$$||\text{Distance before the movement}-\text{Distance after the movement}|-\text{Sonar movement amount}| \leq \text{threshold} \quad (1)$$

According to this determination method, whether the object is positioned on the estimated straight line 50 can be easily determined on the basis of the detected distance to the object before and after the movement of the vehicle and the sonar movement amount before and after the movement of the vehicle. This threshold can be optionally set; however, with a smaller value (a value closer to 0), it is possible to determine whether the object is positioned on the estimated straight line 50 with higher accuracy.

Figure 7:
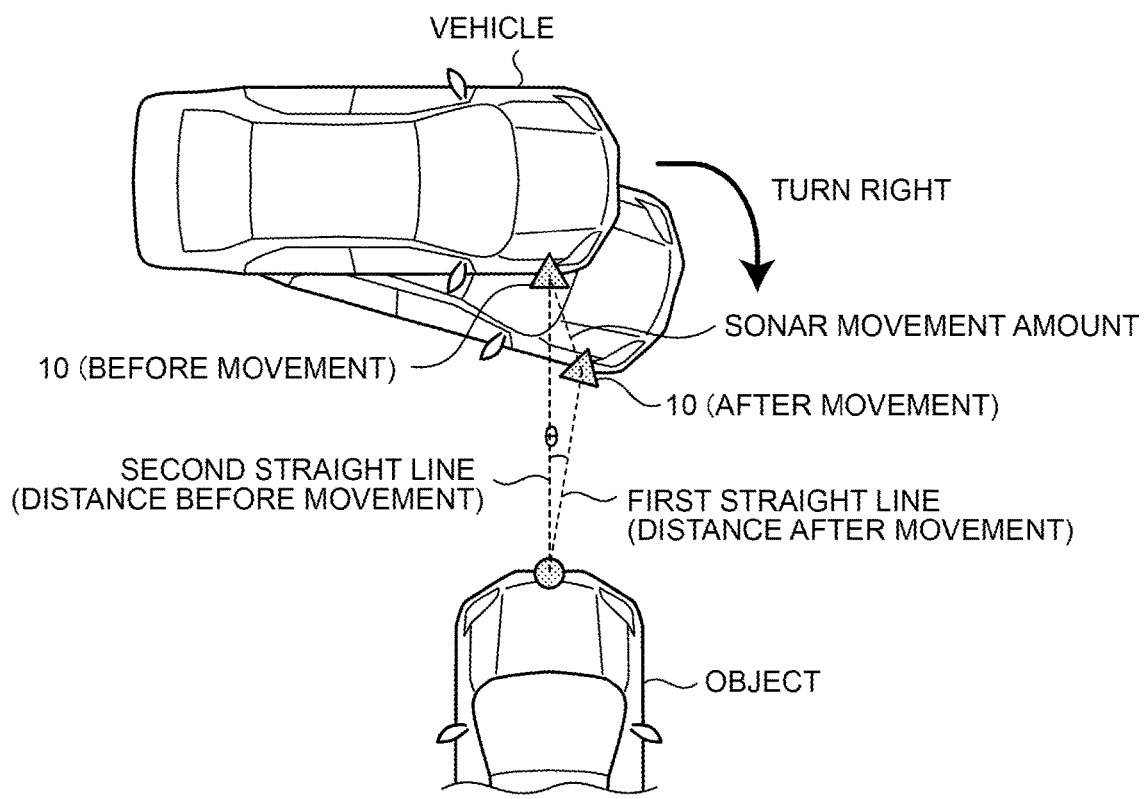
FIG. 7 is a diagram for explaining another method for determining whether an object is positioned on the estimated straight line according to the embodiment.

Another method may be used for determining whether the object is positioned on the estimated straight line 50. For example, as illustrated in FIG. 7, the determination part 322 calculates a first straight line indicating the detected distance to the object (distance after the movement) based on the detection time after the movement of the vehicle, and a second straight line indicating the detected distance to the object (distance before the movement) based on the detection time before the movement of the vehicle. When an angle θ between the first straight line and the second straight line is equal to or smaller than a predetermined angle, the determination part 322 makes determination that the object is positioned on the estimated straight line 50.

According to the determination method, it is possible to calculate the first and the second straight lines indicating detected distances to the object before and after the movement of the vehicle, and easily determine whether the object is positioned on the estimated straight line 50 by using the angle between these straight lines. This predetermined angle can also be optionally set; however, with a smaller value (a value closer to 0 degrees), it is possible to determine whether the object is positioned on the estimated straight line 50 with higher accuracy.

In the determination methods described above, as the detected distance (the distance before the movement, and the distance after the movement) is smaller, determination can be performed with higher accuracy while suppressing a permissible fluctuation width to be small.

Figure 8:
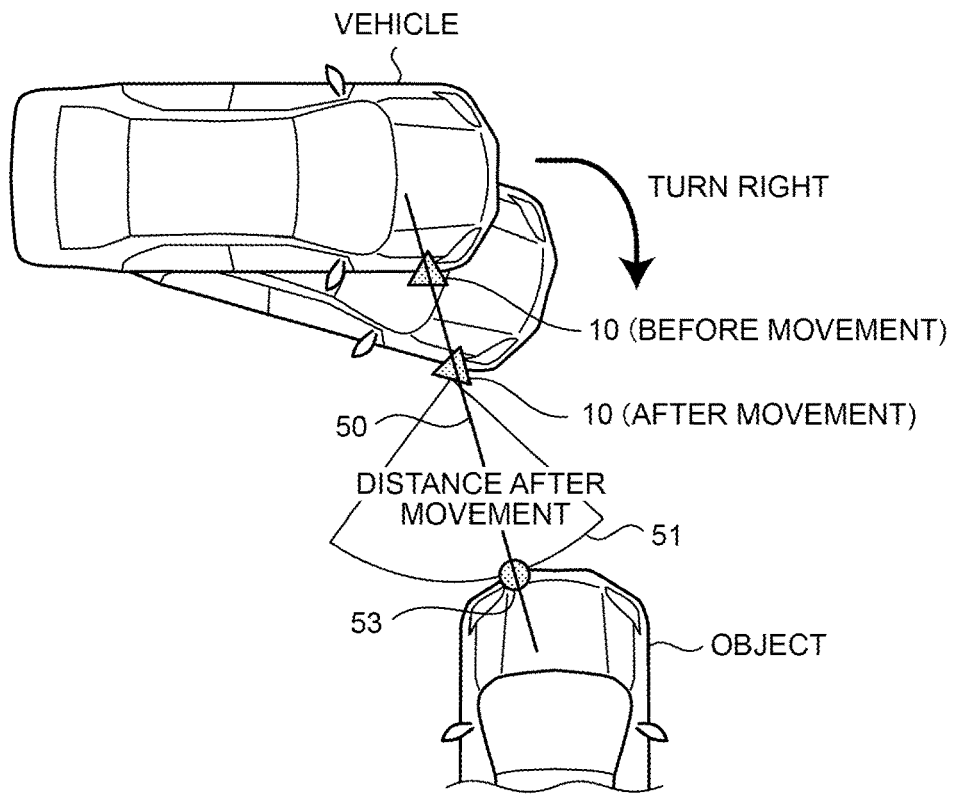
FIG. 8 is a diagram for explaining a method for calculating coordinates indicating a position of an object when the object is determined to be positioned on the estimated straight line according to the embodiment.

Returning to FIG. 4, the description will be continued. When an object is determined to be positioned on the estimated straight line 50 as a result of executing the determination method described above, the first coordinate calculation part 323 calculates coordinates indicating the position of this object. Specifically, as illustrated in FIG. 8, the first coordinate calculation part 323 calculates an intersection point 53 of the estimated straight line 50 and a circular-arc locus 51 obtained from the detection time after the movement of the vehicle as the coordinates indicating the position of the detected object. The circular-arc locus 51 is generated by connecting positions at which the object may be present. The circular-arc locus 51 is calculated as a circular arc that is estimated on assumption that the sonar device 10 after the movement is the center, and the detected distance to the object (distance after the movement) based on the detection time after the movement is a radius. In the present embodiment, the first coordinate calculation part 323 calculates the intersection point 53 of the estimated straight line 50 and the locus 51 described above after the movement of the vehicle as the coordinates indicating the position of the detected object. Therefore, the position of the object can be detected on the basis of a direction in which the object may be present and the distance to the object.

In object detection using the sonar device 10 described above, it is also possible to calculate an intersection point of a circular-arc locus obtained from the detection time before the movement of the vehicle and a circular-arc locus obtained from the detection time after the movement of the vehicle as the coordinates indicating the position of the object. However, some errors tend to be caused in the detected distance to the object based on the detection time of the sonar device 10. Therefore, the errors described above affect accuracy of detecting the position of the object in the method for calculating the intersection point of circular-arc loci before and after the movement of the vehicle as the coordinates indicating the position of the object. For example, in a case where the respective positions of the sonar device 10 before and after the movement of the vehicle and the object are arranged in a straight line, it is assumed that the errors described above significantly affect detection accuracy for the position of the object.

Figure 9:
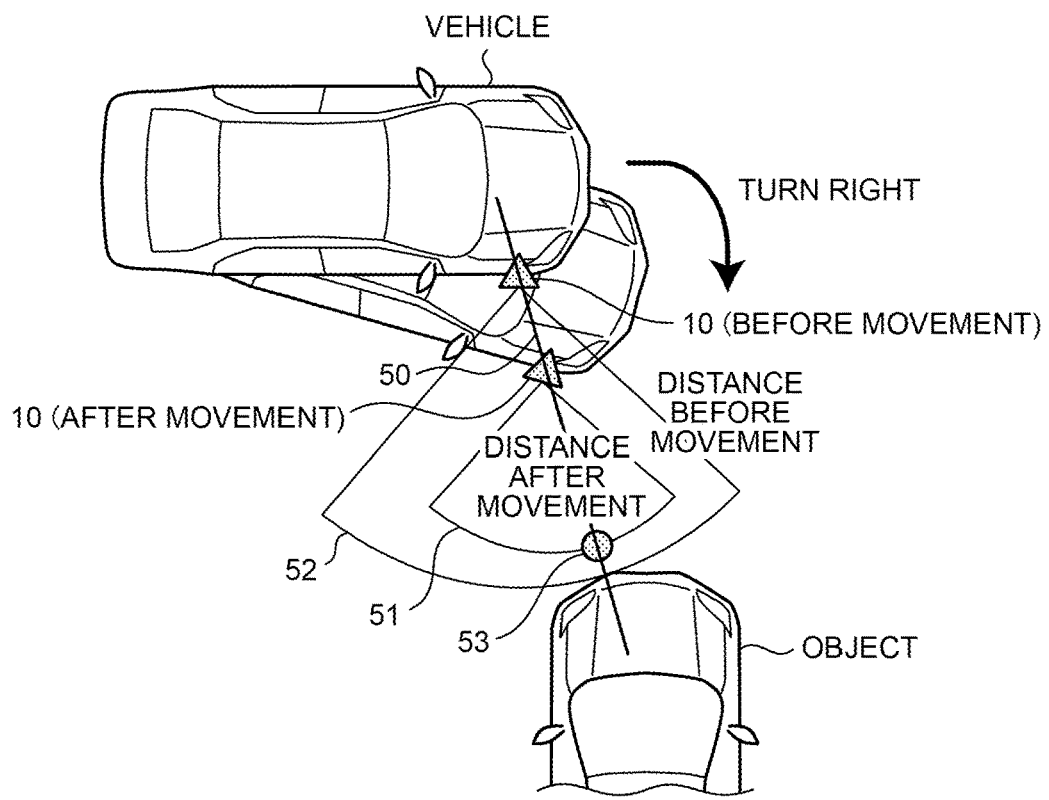
FIG. 9 is a diagram for explaining a method for calculating coordinates indicating a position of an object in a case where a distance to the object after movement of the vehicle according to the embodiment is shorter than an actual distance.

For example, as illustrated in FIG. 9, in a case where the detected distance to the object (distance after the movement) based on the detection time after the movement of the vehicle is detected to be shorter than an actual distance, a circular-arc locus 52 obtained from the detection time before the movement of the vehicle does not intersect with the circular-arc locus 51 obtained from the detection time after the movement of the vehicle. Therefore, the coordinates indicating the position of the object are difficult to be calculated by the method described above. On the other hand, in the present embodiment, as illustrated in FIG. 9, the first coordinate calculation part 323 calculates the intersection point 53 of the estimated straight line 50 and the circular-arc locus 51 obtained from the detection time after the movement of the vehicle as the coordinates indicating the position of the detected object. The intersection point 53 is positioned closer to the vehicle than an actual position of the object, whereas it is positioned on the estimated straight line 50. Therefore, the position of the object can be detected with high accuracy.

Figure 10:
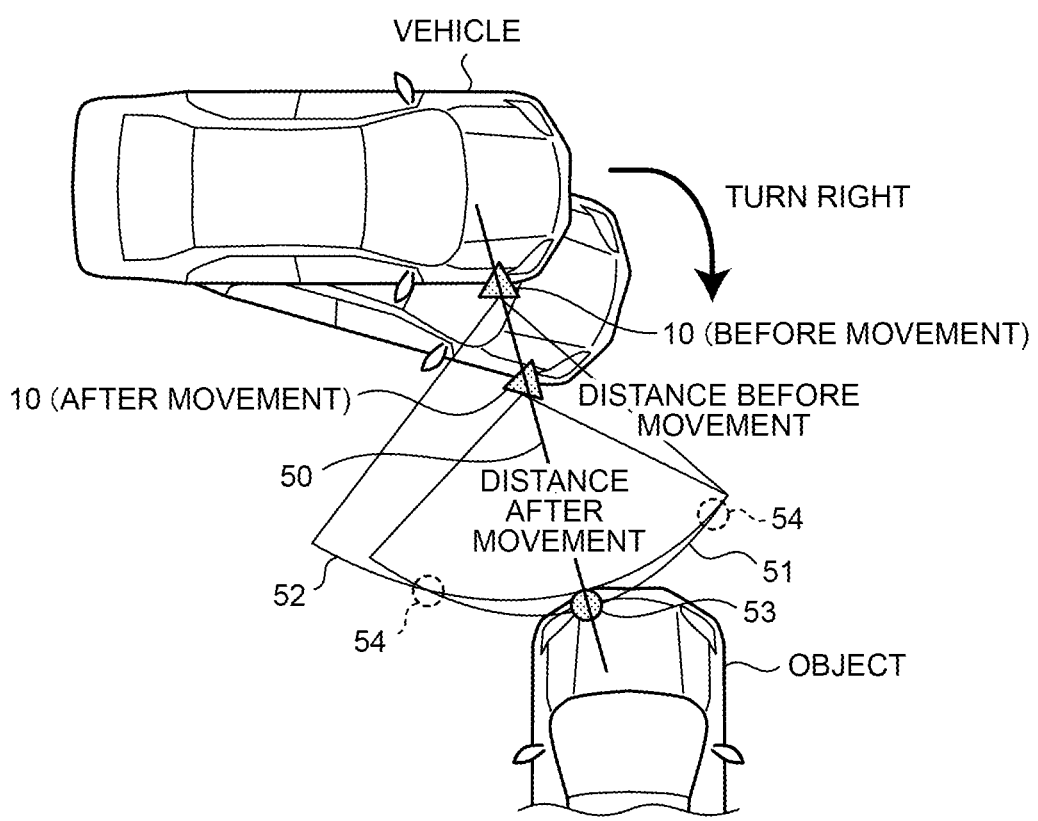
FIG. 10 is a diagram for explaining a method for calculating coordinates indicating a position of an object in a case where a distance to the object after movement of the vehicle according to the embodiment is longer than an actual distance.

Moreover, as illustrated in FIG. 10, in a case where the detected distance to the object (distance after the movement) based on the detection time after the movement of the vehicle is detected to be longer than the actual distance, an intersection point 54 of the circular-arc locus 52 obtained from the detection time before the movement of the vehicle and the circular-arc locus 51 obtained from the detection time after the movement of the vehicle is generated to be largely shifted from the actual position of the object. Intersection points 54 are generated on both sides across the estimated straight line 50. A shift amount of the intersection point 54 with respect to the actual position of the object becomes larger as the detected distances (the distance before the movement and the distance after the movement) become larger. On the other hand, in the present embodiment, as illustrated in FIG. 9, the first coordinate calculation part 323 calculates the intersection point 53 of the estimated straight line 50 and the circular-arc locus 51 obtained from the detection time after the movement of the vehicle as the coordinates indicating the position of the detected object. The intersection point 53 is positioned on a side farther from the vehicle than the actual position of the object, whereas it is positioned on the estimated straight line 50. Therefore, the position of the object can be detected with high accuracy.

In this way, in the present embodiment, even in a case where the respective positions of the sonar device 10 before and after the movement of the vehicle and the object are arranged in a straight line, the position of the object can be detected with high accuracy while suppressing influence of detection errors.

Figure 11:
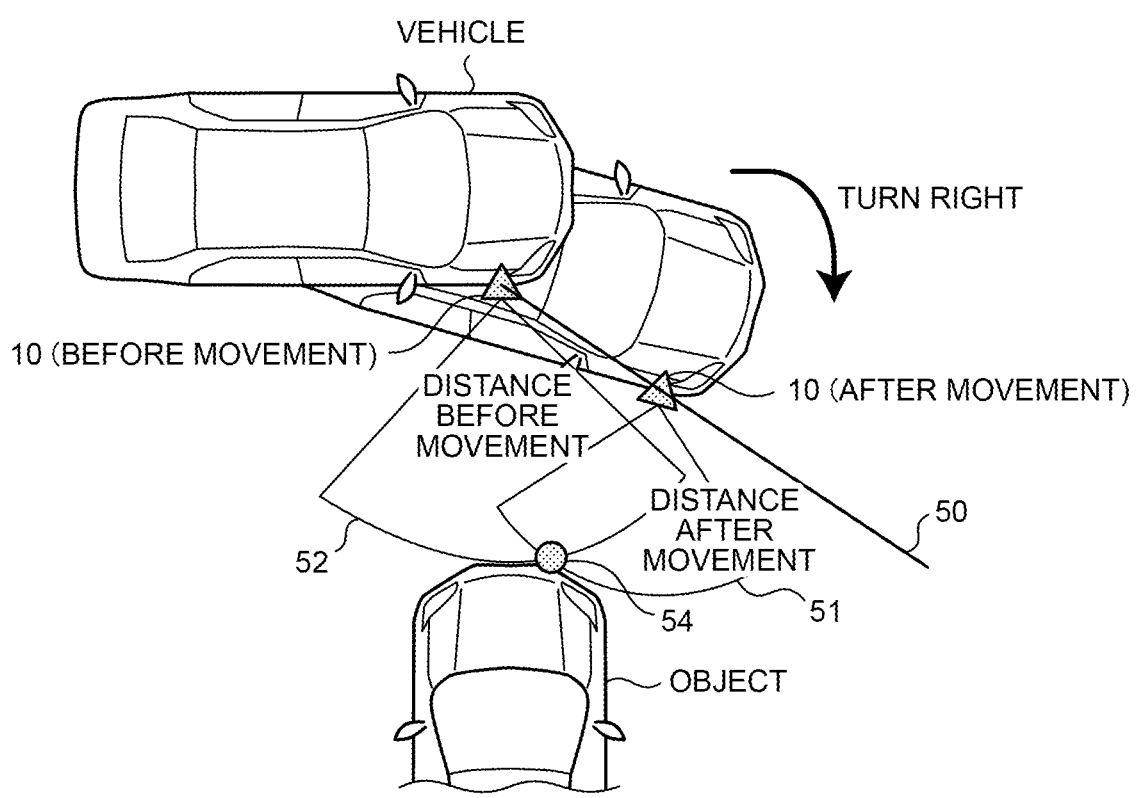
FIG. 11 is a diagram for explaining a method for calculating coordinates indicating a position of an object when the object is determined not to be positioned on the estimated straight line according to the embodiment.

Returning to FIG. 4, the description will be continued. The second coordinate calculation part 324 mainly calculates the coordinates indicating the position of an object when this object is determined not to be positioned on the estimated straight line 50 as a result of executing the above-described determination method. Specifically, as illustrated in FIG. 11, the second coordinate calculation part 324 calculates, as the coordinates indicating the position of the object, the intersection point 54 of the circular-arc locus 52 obtained from the detection time before the movement of the vehicle and the circular-arc locus 51 obtained from the detection time after the movement of the vehicle. In this configuration, the object and the respective positions of the sonar device 10 before and after the movement of the vehicle are not arranged in a straight line. Due to this, even in a case where, for example, the detected distance to the object (distance after the movement) based on the detection time after the movement of the vehicle is detected to be shorter (or longer) than the actual distance, the error in the detected distance does not significantly affect detection accuracy for the position of the object. Therefore, the position of the object can be detected with high accuracy.

In this way, in the present embodiment, the method for calculating the coordinates indicating the position of an object is different between the case where the object is determined to be positioned on the estimated straight line 50 and the case where the object is determined not to be positioned on the estimated straight line 50. Therefore, the position of the object around the vehicle can be detected with high accuracy. Even in a case other than the case where the object is determined not to be positioned on the estimated straight line 50, the second coordinate calculation part 324 may perform an operation of calculating the intersection point 54 of the circular-arc loci 51 and 52 obtained from the detection time before and after the movement of the vehicle regardless of a determination result.

Returning to FIG. 4, the description will be continued. In the present embodiment, as described above, in a case where the object is determined to be positioned on the estimated straight line 50, the first coordinate calculation part 323 calculates the intersection point 53 of the estimated straight line 50 and the circular-arc locus 51 obtained from the detection time after the movement of the vehicle as the coordinates indicating the position of the detected object. However, it is found that, even in a case where the object is determined to be positioned on the estimated straight line 50, there may be a case where the actual object is not positioned on the estimated straight line 50. Thus, in a case where the coordinates calculated by the second coordinate calculation part 324 satisfy a predetermined condition, the selection part 325 selects the coordinates calculated at the position after the movement by the second coordinate calculation part 324 regardless of the determination result of whether the object is positioned on the estimated straight line 50 described above.

Herein, for convenience of description, the coordinates calculated by the first coordinate calculation part 323 are referred to as first coordinates, and the coordinates calculated by the second coordinate calculation part 324 are referred to as second coordinates. In a case where each of the first coordinate calculation part 323 and the second coordinate calculation part 324 calculates coordinates multiple times over time, calculation at the position after the movement is referred to as current calculation, and calculation at the position before the movement is referred to as previous calculation. The previous calculation means the calculation performed before the current calculation. In a case where a distance between the second coordinates currently calculated and the second coordinates previously calculated by the second coordinate calculation part 324 is equal to or smaller than a predetermined distance, the selection part 325 selects the second coordinates currently calculated by the second coordinate calculation part 324 regardless of the determination result of whether the object is positioned on the estimated straight line 50 described above. Herein, the predetermined distance is an optionally set value. However, the predetermined distance is used for determining whether two pairs of the second coordinates are close to each other, so that the predetermined distance is preferably a value at least smaller than a movement amount of the vehicle (sonar device 10) before and after the movement.

Figure 12:
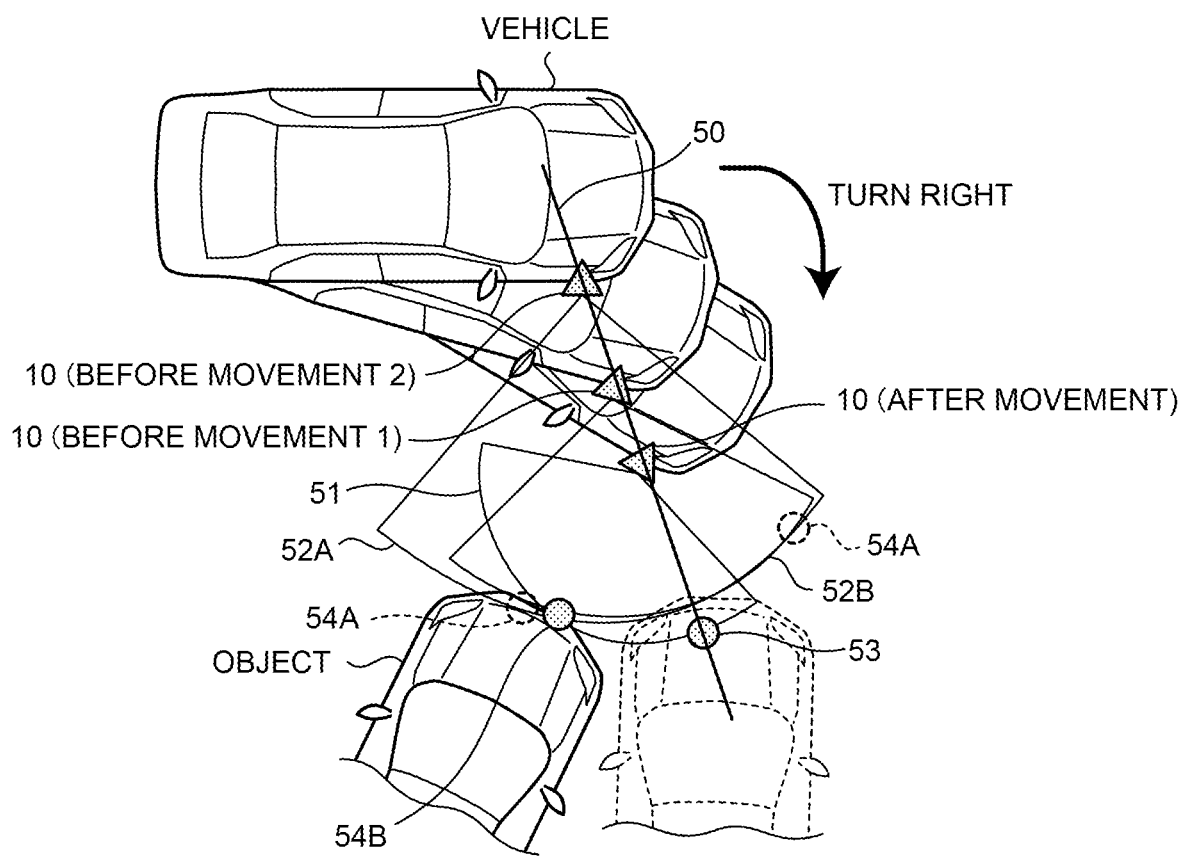
FIG. 12 is a diagram for explaining a method for calculating coordinates indicating an actual position of an object in a case where the determination that the object is positioned on the estimated straight line according to the embodiment is a mistake.

As illustrated in FIG. 12, when the object is determined to be positioned on the estimated straight line 50 connecting the respective positions of the sonar device 10 before the movement 1 and after the movement of the vehicle, the first coordinate calculation part 323 calculates, as the first coordinates, the intersection point 53 of the estimated straight line 50 and the circular-arc locus 51 obtained from the detection time after the movement of the vehicle. Thus, the object is detected to be positioned at the first coordinates (intersection point 53).

The second coordinate calculation part 324 calculates, as the second coordinates indicating the position of the object, an intersection point 54A of a circular-arc locus 52A obtained from the detection time before the movement 2 of the vehicle and a circular-arc locus 52B obtained from the detection time before the movement 1 of the vehicle. Additionally, the second coordinate calculation part 324 calculates, as the second coordinates indicating the position of the object, an intersection point 54B of a circular-arc locus 52B obtained from the detection time before the movement 1 of the vehicle and the circular-arc locus 51 obtained from the detection time after the movement of the vehicle. In a case where a distance between the second coordinates (intersection point 54B) currently calculated and the second coordinates (intersection point 54A) previously calculated by the second coordinate calculation part 324 is equal to or smaller than the predetermined distance, the selection part 325 selects the second coordinates (intersection point 54B) currently calculated by the second coordinate calculation part 324 regardless of the determination result of whether the object is positioned on the estimated straight line 50 described above.

With this configuration, even in a case where a mistake is made in the determination that the object is positioned on the estimated straight line 50, the position of the object can be detected with high accuracy.

The description about FIG. 4 will be continued. The peripheral map creation part 330 creates a peripheral map (map) of the vehicle using the coordinates calculated by the lateral object detection part 320. The lateral collision determination part 340 performs collision determination for the vehicle (on a lateral side) using created map information. The parking space creation part 350 creates a parking space in which the vehicle can be parked using the created map information. In a case where determination is made such that a collision will occur (case where the vehicle approaches coordinates present in a traveling direction of the vehicle), the vehicle control part 360 performs control for operating a brake of the vehicle. Additionally, the vehicle control part 360 performs control for operating the vehicle to park the vehicle in the created parking space. The specific configuration of the vehicle control device 30 according to the present embodiment has been described above.

Figure 13:
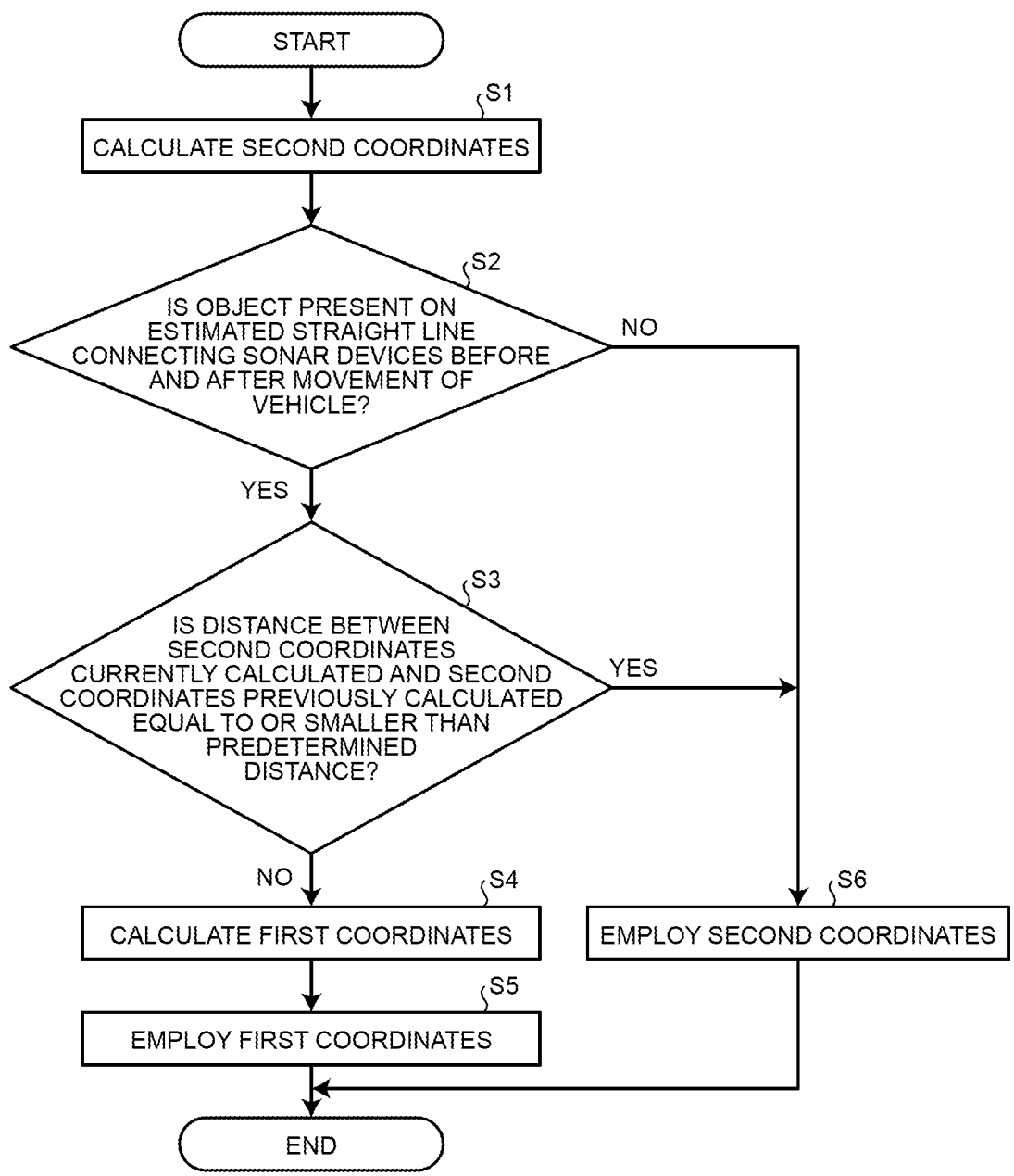
FIG. 13 is a flowchart indicating an operation procedure of a lateral object detection part according to the embodiment.

Next, the following describes an operation of the lateral object detection part 320 with reference to FIG. 13. First, the second coordinate calculation part 324 calculates the second coordinates (Step S1). The second coordinate calculation part 324 calculates, as the second coordinates indicating the position of the object, the intersection point 54 of the circular-arc locus 52 obtained from the detection time before the movement of the vehicle and the circular-arc locus 51 obtained from the detection time after the movement of the vehicle. The second coordinate calculation part 324 calculates the second coordinates described above at predetermined intervals along with the movement of the vehicle, and stores at least the currently calculated second coordinates and the previously calculated second coordinates.

Next, the determination part 322 determines whether the object is present on the estimated straight line 50 connecting the sonar devices 10 before and after the movement of the vehicle (Step S2). Specifically, the straight line calculation part 321 calculates the estimated straight line connecting the respective positions of the sonar device 10 before and after the movement of the vehicle. For example, in a case where a difference value between the sonar movement amount before and after the movement of the vehicle and a difference between the detected distance to the object (distance before the movement) based on the detection time before the movement of the vehicle and the detected distance to the object (distance after the movement) based on the detection time after the movement of the vehicle is equal to or smaller than a predetermined threshold, the determination part 322 makes determination that the object is present on the estimated straight line 50.

In this determination, when the object is determined to be present on the estimated straight line 50 (Yes at Step S2), the process is advanced to Step S3. When the object is determined not to be present on the estimated straight line 50 (No at Step S2), the process is advanced to Step S6.

Next, the second coordinate calculation part 324 determines whether the current second coordinates calculated at Step S1 are close to the previous second coordinates, for example, whether a distance between them is equal to or smaller than the predetermined distance (Step S3). The second coordinate calculation part 324 reads out the current second coordinates and the previous second coordinates that have been stored, and determines whether the distance between them is equal to or smaller than the predetermined distance (for example, at least equal to or smaller than the sonar movement amount before and after the movement of the vehicle).

In this determination, when the distance between the current second coordinates and the previous second coordinates is not equal to or smaller than the predetermined distance (No at Step S3), the process is advanced to Step S4. When the distance between the current second coordinates and the previous second coordinates is equal to or smaller than the predetermined distance (Yes at Step S3), the process is advanced to Step S6.

Next, the first coordinate calculation part 323 calculates the first coordinates (Step S4). Specifically, the first coordinate calculation part 323 calculates, as the first coordinates indicating the position of the detected object, the intersection point 53 of the estimated straight line 50 calculated at Step S2 and the circular-arc locus 51 obtained from the detection time after the movement of the vehicle. The first coordinates calculated as the position of the object is then employed (Step S5), and the process is ended.

Additionally, the selection part 325 employs the second coordinates calculated as the position of the object (Step S6). Specifically, when the object is determined not to be present on the estimated straight line 50 (No at Step S2), or when the distance between the current second coordinates and the previous second coordinates is equal to or smaller than the predetermined distance (Yes at Step S3), the current second coordinates (after the movement) calculated at Step S1 are selected. The second coordinates are employed as the position of the object, and the process is ended.

As described above, the vehicle control device 30 according to the present embodiment controls the vehicle on the basis of the detection time representing the distance measured by the sonar device 10 that is mounted on the vehicle to measure the distance to the object around the vehicle by transmitting and receiving sound waves. The vehicle control device 30 includes: the straight line calculation part 321 configured to calculate the estimated straight line 50 connecting the respective positions of the sonar device 10 before and after the movement of the vehicle; the determination part 322 configured to determine whether the object is positioned on the calculated estimated straight line 50; and the first coordinate calculation part 323 configured to calculate, as the coordinates indicating the position of the object, the intersection point 53 of the estimated straight line 50 and the circular-arc locus 51 obtained from the detection time after the movement of the vehicle in a case where the object is determined to be positioned on the estimated straight line 50. With this configuration, even in a case where the object and the respective positions of the sonar device 10 before and after the movement of the vehicle are arranged on the estimated straight line 50, the position of the object can be detected on the basis of the direction in which the object may be present and the distance to the object. Due to this, the accuracy of collision determination can be enhanced.

The vehicle control device 30 according to the present embodiment also includes the second coordinate calculation part 324 configured to calculate, as the coordinates indicating the position of the object, the intersection point 54 of the circular-arc locus 52 obtained from the detection time before the movement of the vehicle and the circular-arc locus 51 obtained from the detection time after the movement of the vehicle in a case where the object is determined not to be positioned on the straight line. With this configuration, in a case where the object and the respective positions of the sonar device 10 before and after the movement of the vehicle are not arranged on the estimated straight line 50, the position of the object can be detected with high accuracy.

In the vehicle control device 30 according to the present embodiment, in a case where a difference value between the movement amount of the sonar device 10 before and after the movement of the vehicle and a difference between the distance to the object before the movement based on the detection time before the movement of the vehicle and the distance to the object after the movement based on the detection time after the movement of the vehicle is equal to or smaller than the predetermined threshold, the determination part 322 makes determination that the object is positioned on the estimated straight line 50. With this configuration, whether the object is positioned on the estimated straight line 50 can be easily determined.

In the vehicle control device 30 according to the present embodiment, in a case where the angle θ between the first straight line indicating the distance to the object after the movement based on the detection time after the movement of the vehicle and the second straight line indicating the distance to the object before the movement based on the detection time before the movement of the vehicle is equal to or smaller than the predetermined angle, the determination part 322 makes determination that the object is positioned on the estimated straight line 50. With this configuration, whether the object is positioned on the estimated straight line 50 can be easily determined.

The vehicle control device 30 according to the present embodiment also includes the selection part 325 configured to select, in a case where a distance between the second coordinates currently calculated and the second coordinates previously calculated by the second coordinate calculation part 324 is equal to or smaller than the predetermined distance, the second coordinates currently calculated by the second coordinate calculation part 324 regardless of the determination result obtained by the determination part 322. With this configuration, even in a case where a mistake is made in the determination that the object is positioned on the estimated straight line 50, the position of the object can be detected with high accuracy.

The embodiment of the present disclosure has been described above. However, the embodiment described above is merely an example, and does not intend to limit the scope of claims. This novel embodiment can be implemented in other various forms, and can be variously omitted, replaced, or modified without departing from the gist of the present disclosure. This novel embodiment and modifications thereof are encompassed by the scope and the gist of the present disclosure, and encompassed by the description in claims and equivalents thereof.

Effects in the embodiment described in this specification are merely examples, and are not limited thereto. Other effects may be exhibited.

Additionally, the expression of " . . . part" in the embodiment described above may be replaced with other expressions such as " . . . circuit (circuitry)", " . . . assembly", " . . . device", " . . . unit", or " . . . module".

In the embodiment described above, exemplified is the configuration of the present disclosure using hardware, but the present disclosure may also be implemented by software in cooperation with hardware.

Functional blocks used in the description of the embodiment described above are typically implemented as a large scale integrated circuit (LSI) as an integrated circuit. The integrated circuit may control each of the functional blocks used in the description of the embodiment described above, and may include an input terminal and an output terminal. Each of them may be individually made into one chip, or may be made into one chip to include part or all of them. The LSI is used herein, but it may be called an IC, a system LSI, a super LSI, or an ultra LSI depending on a difference in integration.

A method for making an integrated circuit is not limited to the LSI, and it may be implemented by using a dedicated circuit or a general-purpose processor, and a memory. After manufacturing the LSI, a field programmable gate array (FPGA) that can be programmed, and a reconfigurable processor that can reconstruct connection or setting of a circuit cell inside the LSI may be used.

Moreover, if a technique of making an integrated circuit to be replaced with the LSI appears due to progress of semiconductor technique or another derived technique, this technique may be used to integrate the functional blocks as a matter of course. Biotechnology may be applied, for example.

What is claimed is:

1. A vehicle control device controlling a vehicle on the basis of a detection time representing a distance measured by a range finder device, the range finder device being installed in the vehicle to measure a distance to an object around the vehicle by transmitting and receiving sound waves, the vehicle control device comprising:
   a memory; and
   a processor connected to the memory and configured to
      receive an input of a first detection time after movement of the vehicle, and
      output an intersection point as coordinates indicating a position of the object when the intersection point is obtained, the intersection point being a point at which an estimated straight line and a first locus intersect, the estimated straight line connecting respective positions of the range finder device before and after the movement of the vehicle, the first locus being based on the first detection time.

2. The vehicle control device according to claim 1, wherein the processor is further configured to
   receive an input of a second detection time before the movement of the vehicle, and
   output an intersection point as coordinates indicating a position of the object when an intersection point between the estimated straight line and the locus is not obtained, the intersection point to be output being a point at which a second locus and the first locus intersect, the second locus being based on the second detection time.

3. The vehicle control device according to claim 1, wherein the processor is further configured to
   receive an input of a second detection time before the movement of the vehicle, and
   make determination that the object is positioned on the estimated straight line when a difference value is equal to or smaller than a predetermined threshold, the difference value indicating a difference between a difference in distance to the object and a movement amount of the range finder device before and after the movement of the vehicle, the difference in distance to the object being a difference between a first distance to the object based on the first detection time and a second distance to the object based on the second detection time.

4. The vehicle control device according to claim 1, wherein the processor is further configured to
   receive an input of a second detection time before the movement of the vehicle, and
   make determination that the object is positioned on the estimated straight line when an angle between a first straight line and a second straight line is equal to or smaller than a predetermined angle, the first straight line representing a first distance to the object based on the first detection time, the second straight line representing a second distance to the object based on the second detection time.

5. The vehicle control device according to claim 1, wherein the processor is further configured to
receive an input of a second detection time before the movement of the vehicle, and
output first coordinates as a position of the object when a distance between the first coordinates and second coordinates is equal to or smaller than a predetermined distance, the first coordinates being an intersection point between the estimated straight line and the first locus based on the first detection time, the second coordinates being an intersection point between the estimated straight line and the second locus based on the second detection time.

6. A vehicle control method implemented by a vehicle control device controlling a vehicle on the basis of a detection time representing a distance measured by a range finder device, the range finder device being installed in the vehicle to measure a distance to an object around the vehicle by transmitting and receiving sound waves, the method comprising:
receiving an input of a first detection time after movement of the vehicle; and
outputting an intersection point as coordinates indicating a position of the object when the intersection point is obtained, the intersection point being a point at which an estimated straight line and a first locus intersect, the estimated straight line connecting respective positions of the range finder device before and after the movement of the vehicle, the first locus being based on the first detection time.

7. The vehicle control method according to claim 6, further comprising:
receiving an input of a second detection time before the movement of the vehicle; and
outputting an intersection point as coordinates indicating a position of the object when an intersection point between the estimated straight line and the locus is not obtained, the intersection point to be output being a point at which a second locus and the first locus intersect, the second locus being based on the second detection time.

8. The vehicle control method according to claim 6, further comprising:
receiving an input of a second detection time before the movement of the vehicle; and
making determination that the object is positioned on the estimated straight line when a difference value is equal to or smaller than a predetermined threshold, the difference value indicating a difference between a difference in distance to the object and a movement amount of the range finder device before and after the movement of the vehicle, the difference in distance to the object being a difference between a first distance to the object based on the first detection time and a second distance to the object based on the second detection time.

9. The vehicle control method according to claim 6, further comprising:
receiving an input of a second detection time before the movement of the vehicle; and
making determination that the object is positioned on the estimated straight line when an angle between a first straight line and a second straight line is equal to or smaller than a predetermined angle, the first straight line representing a first distance to the object based on the first detection time, the second straight line representing a second distance to the object based on the second detection time.

10. The vehicle control method according to claim 6, further comprising:
receiving an input of a second detection time before the movement of the vehicle; and
outputting first coordinates as a position of the object when a distance between the first coordinates and second coordinates is equal to or smaller than a predetermined distance, the first coordinates being an intersection point between the estimated straight line and the first locus based on the first detection time, the second coordinates being an intersection point between the estimated straight line and the second locus based on the second detection time.

11. A non-transitory computer-readable recording medium on which programmed instructions are recorded, the programmed instructions causing a computer to execute processing for controlling a vehicle on the basis of a detection time representing a distance measured by a range finder device, the range finder device being installed in the vehicle to measure a distance to an object around the vehicle by transmitting and receiving sound waves, the processing to be executed by the computer comprising:
receiving an input of a first detection time after movement of the vehicle; and
outputting an intersection point as coordinates indicating a position of the object when the intersection point is obtained, the intersection point being a point at which an estimated straight line and a first locus intersect, the estimated straight line connecting respective positions of the range finder device before and after the movement of the vehicle, the first locus being based on the first detection time.

* * * * *